US010914464B2

(12) United States Patent
Hikmet et al.

(10) Patent No.: US 10,914,464 B2
(45) Date of Patent: Feb. 9, 2021

(54) LIGHTING MODULE, A LIGHTING SYSTEM AND A METHOD OF LIGHTING

(71) Applicant: SIGNIFY HOLDING B.V., Eindhoven (NL)

(72) Inventors: Rifat Ata Mustafa Hikmet, Eindhoven (NL); Ties Van Bommel, Horst (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/492,183

(22) PCT Filed: Mar. 9, 2018

(86) PCT No.: PCT/EP2018/055916
§ 371 (c)(1),
(2) Date: Sep. 9, 2019

(87) PCT Pub. No.: WO2018/166914
PCT Pub. Date: Sep. 20, 2018

(65) Prior Publication Data
US 2020/0003404 A1    Jan. 2, 2020

(30) Foreign Application Priority Data
Mar. 14, 2017    (EP) .................................. 17160734

(51) Int. Cl.
*F21V 23/04*    (2006.01)
*F21S 4/28*    (2016.01)
(Continued)

(52) U.S. Cl.
CPC ............ *F21V 23/0464* (2013.01); *F21S 4/28* (2016.01); *G02B 6/0005* (2013.01); *G02B 19/0066* (2013.01)

(58) Field of Classification Search
CPC ...... F21V 23/0464; F21S 4/28; G02B 6/0005; G02B 19/0066; G02F 1/133615; G02F 1/133602
See application file for complete search history.

(56) References Cited

U.S. PATENT DOCUMENTS 10,473,275 B2 * 11/2019 Peeters .................... F21K 9/61
2002/0114147 A1    8/2002 Harter
(Continued)

FOREIGN PATENT DOCUMENTS

DE    102006056150 A1    5/2008
EP        1746666 A2    1/2007
(Continued)

*Primary Examiner* — Ismael Negron
*Assistant Examiner* — Christopher E Dunay
(74) *Attorney, Agent, or Firm* — Daniel J. Piotrowski

(57) ABSTRACT

The invention provides a lighting module (100) which comprises a plurality of first light sources (101) configured for emitting first light (102) in a first predetermined direction, and at least one second light source (103) configured for emitting second light (104). The lighting module (100) further comprises a light guide (105) which comprises at least one light in-coupling portion (106) to couple at least part of the second light (104) into the light guide (105), and a plurality of light out-coupling portions (107) to couple at least part of the second light (104) out of the light guide (105). The light guide (105) is arranged to guide the second light (104) coupled into the light guide (105) at the at least one light in-coupling portion (106) via total internal reflection (108) to the plurality of light out-coupling portions (107) for generating out-coupled light in a second predetermined direction. The light guide (105) is mechanically coupled to and extends along the plurality of first light sources (101). The light out-coupling portions (107) cover a larger first area (109) than a second area (110) covered by the plurality of first light sources (101). A total luminous flux
(Continued)

generated by the at least one second light source (103) is lower than a total luminous flux generated by the plurality of the first light sources (101). The first predetermined direction and the second predetermined direction at least partly overlap.

14 Claims, 8 Drawing Sheets

(51) Int. Cl.
*F21V 8/00* (2006.01)
*G02B 19/00* (2006.01)

(56) References Cited

U.S. PATENT DOCUMENTS

| | | | |
|---|---|---|---|
| 2005/0099107 A1 | 5/2005 | Kang et al. | |
| 2007/0081321 A1* | 4/2007 | Ahn | G02F 1/133615 362/97.3 |
| 2008/0157009 A1* | 7/2008 | Wittenberg | G02B 6/0055 250/494.1 |
| 2011/0194306 A1* | 8/2011 | Krijn | G02B 6/004 362/607 |
| 2014/0104867 A1 | 4/2014 | Meng | |
| 2014/0300528 A1 | 10/2014 | Ebisui et al. | |
| 2015/0346499 A1* | 12/2015 | Minami | G02B 6/0038 362/606 |
| 2016/0054506 A1* | 2/2016 | Okimoto | G02B 6/0076 349/67 |
| 2017/0003439 A1* | 1/2017 | Lee | G02B 6/0058 |
| 2018/0031752 A1* | 2/2018 | Ferrini | G02B 6/0018 |

FOREIGN PATENT DOCUMENTS

| | | |
|---|---|---|
| EP | 2949990 A1 | 12/2015 |
| JP | 5831895 B2 | 12/2015 |
| KR | 479933 Y1 | 3/2016 |
| WO | 02/066893 A1 | 8/2002 |
| WO | 2011091615 A1 | 8/2011 |

* cited by examiner

LIGHTING MODULE, A LIGHTING SYSTEM AND A METHOD OF LIGHTING

CROSS-REFERENCE TO PRIOR APPLICATIONS

This application is the U.S. National Phase application under 35 U.S.C. § 371 of International Application No. PCT/EP2018/055916, filed on Mar. 9, 2018, which claims the benefit of European Patent Application No. 17160734.4, filed on Mar. 14, 2017. These applications are hereby incorporated by reference herein.

FIELD OF THE INVENTION

The present invention relates to a lighting module, to a lighting system comprising the lighting module, and to a method of lighting using the lighting system.

BACKGROUND OF THE INVENTION

US2014/0104867 discloses a LED lamp which comprising a light emitting diode (LED) strip and a cylindrical light guide body which is connected to the LED strip. The light emitted from the LED strip irradiates towards the light guide body and exits via the surface of the light guide body. The LED lamp provides high quality light at high intensities, but has a disadvantage that it cannot provide high quality light at low intensities.

SUMMARY OF THE INVENTION

An object of the present invention is to provide a lighting module which allows for providing high quality light both at high and low intensities. For example, the invention describes a strip with solid state light sources which provides high quality light at high and very low intensities.

The present invention discloses a lighting module in accordance with the independent claim 1. Preferred embodiments are defined by the dependent claims.

According to a first aspect of the invention, a lighting module is provided which comprises a plurality of first light sources, at least one second light source, and a light guide. The plurality of first light sources emits first light in a first predetermined direction. The at least one second light source emits second light. The light guide comprises at least one light in-coupling portion for coupling at least part of the second light into the light guide, a plurality of light out-coupling portions for coupling at least part of the second light out of the light guide. The light guide is arranged to guide the second light coupled into the light guide at the least one light in-coupling portion via total internal reflection to the plurality of light out-coupling portions to generate out-coupled light in a second predetermined direction. The light guide is mechanically coupled to and extends along the plurality of first light sources. The light out-coupling portions together cover a larger first area than a second area covered by the plurality of first light sources. The total luminous flux generated by the at least one second light source is lower than a total luminous flux generated by the plurality of the first light sources. The first predetermined direction and the second predetermined direction at least partly overlap.

Hence, the invention provides a lighting module, such as for example a strip with a plurality of LEDs, that is able to provide high quality light both at high and low intensities. The reason is that instead of a strip with a plurality of light sources, a plurality of first light sources and at least one second light source in combination with a light guide are used. The plurality of first light sources provide high quality first light at high intensities in a first predetermined direction. The at least one second light source provides second light which at least part of the second light is eventually coupled out of the light guide at the light out-coupling potions which extend along the plurality of first light sources in a second predetermined direction. The total luminous flux generated by the at least one second light source is lower than the total luminous flux generated by the plurality of first light sources. The first predetermined direction and the second predetermined direction at least partly overlap. The effect is that the second light source provides high quality light at low intensities without requiring a dimming of the plurality of first light sources to a low intensity.

The solution proposed in US2014/0104867 is unable to provide high quality light both at high and low intensities. For obtaining low intensities the LEDs of the lighting device disclosed in US2014/0104867 need to be dimmed, for example below 15% of the total light output by using pulse width modulation (PWM). When LEDs are dimmed to such a low total light output, the light output of the LEDs is not stable. For example, a flicker is caused due to a small duty cycle of the current through the LEDs. The effects of such unstable output may be perceivable to a human eye and is therefore undesired.

In an embodiment, the lighting module satisfies the equation wherein the first term I2/E2 is larger than the second term I1/E1. I1 is the amount of in-coupled photons emitted by the plurality of first light sources and that is coupled into the light guide. I2 is the amount of in-coupled photons emitted by the at least one second light source and that is coupled into the light guide. E1 is the amount of photons emitted by the plurality of first light sources. E2 is the amount of photons emitted by the at least one second light source. Thus, the fraction of second light that is coupled into the light guide is higher than the fraction of first light that is coupled into the light guide. The obtained effect is that it further improves the quality of light both at high and low intensities and it provides a highly efficient lighting module. The reason is that light which is not coupled into the light guide results in a higher efficiency compared to light that is coupled into the light guide. This is because no or less light loss, for example due to light absorption by the light guide, will occur. Thus the plurality of first light sources provide high quality first light at high intensities and at high efficiency. The at least one second light source provides high quality second light at low intensities. At low light levels, individual LEDs become better visible compared to LEDs at high light levels. The visibility of individual LEDs, which provides a so-called undesired spottiness appearance, is reduced, because the light is coupled into the light guide and via total internal reflection guided to the plurality of light out-coupling portions. Because the light out-coupling portions cover a larger first area than a second area covered by the first light sources the visibility of the individual LEDs and the so-called undesired spottiness appearance is reduced. The plurality of first light sources may be carried by a first carrier. The first carrier may be a substrate such as a printed circuit board (PCB). The PCB may comprise a foil. The at least one second light sources may be carried by a second carrier. The second carrier may be a substrate such as a printed circuit board. The PCB may be a rigid substrate. The plurality of first light sources and the at least one second light source may be positioned on the same common carrier. The common carrier may be bend at at least one end such that the plurality of first light sources and at least one second light source extend at an angle different from zero. The plurality of first LEDs and the at least one second LED may also be positioned parallel with respect to each other. The light guide may be shaped at an angle different from zero close to the at least one second light source to allow second light to be coupled into the light guide. The light guide may also comprise optics, such as for example a mirror or a refractive optical element close to the at least one second light source to allow second light to be coupled into the light guide.

In an embodiment, the ratio of the first term I2/E2 with respect to the second term I1/E1 is at least 3. More preferably, the ratio of the first term I2/E2 with respect to the second term I1/E1 is at least 5. More preferably, the ratio of the first term I2/E2 with respect to the second term I1/E1 is at least 7. The obtained effect is that it even further improves the quality of light both at high and low intensities and it provides even a highly efficient lighting module. The reason is that light which is not coupled into the light guide results in a higher efficiency compared to light that is coupled into the light guide. This is because no or less light loss, for example due to light absorption by the light guide, will occur. Thus the plurality of first light sources provide high quality first light at high intensities and at high efficiency. The at least one second light source provides high quality second light at low intensities. At low light levels, individual LEDs become better visible compared to LEDs at high light levels. The visibility of individual LEDs, which provides a so-called undesired spotty appearance, is reduced, because the light is coupled into the light guide and via total internal reflection guided to the plurality of light out-coupling portions. Because the light out-coupling portions cover a larger first area than a second area covered by the first light sources the visibility of the individual LEDs and the so-called undesired spotty appearance is reduced. The suggested equation and ratio of the first term provides a lighting module with optimal efficiency and good reduction of spottiness i.e. less spotty appearance.

In an embodiment, the plurality of first light sources is arranged for emitting the first light in a beam. The light guide is arranged in the path of the beam. The second term I1/E1 is 0.1 or less. More preferably, the second term I1/E1 is 0.07 or less. More preferably, the second term I1/E1 is 0.05 or less. The obtained effect is that it further improves the quality of light both at high and low intensities and it provides a highly efficient lighting module. The reason is that light which is not coupled into the light guide results in a higher efficiency compared to light that is coupled into the light guide. This is because no or less light loss, for example due to light absorption by the light guide, will occur. Thus the plurality of first light sources provide high quality first light at high intensities and at high efficiency. The suggested equation and ratio of the second term provides a lighting module with optimal efficiency and good reduction is spottiness i.e. spotty appearance.

The ratio Ei1:E1 is 80% or less. Ei1 is the amount of photons emitted by the plurality of first light sources and impinging on the light guide. E1 is the amount of photons emitted by the plurality of first light sources. More preferably, the ratio Ei1:E1 is 60% or less. Most preferably, the ratio Ei1:E1 is 40% or less. The obtained effect is that it further improves the quality of light both at high and low intensities and it provides a highly efficient lighting module. The reason is that first light which is impinging on the light guide is subjected to light losses due to absorption or reflection when light is transmitting through the light guide. Light which is not impinging on the light guide does not suffer from these light losses. Thus a higher amount of first light which is not impinging on the light guide results in a lighting module with a higher efficiency.

In an embodiment, the second distance (D2) between the light guide and the plurality of first light sources is in the range from 1 to 20 mm. More preferably, the second distance (D2) between the light guide and the plurality of first light sources is in the range from 1 to 15 mm. Most preferably, the second distance (D2) between the light guide and the plurality of first light sources is in the range from 1 to 10 mm. For example, the second distance (D2) between the light guide and the plurality of first light sources is 2 mm. The obtained effect is that the first light and second light exit the lighting module from the same surface. The reason is that the position of the plurality of first light sources is close to the position of the light out-coupling portions of the light guide. The light sources may be solid state light sources such as light emitting diodes (LEDs) or laser diodes. The light guide may be arranged on top of the light output area of more than 90% of the plurality of first light sources. The light guide may also be arranged not on top of the light output area of the plurality of first light sources, but next to the light output area of the plurality of first light sources. For example, the plurality of light sources comprises hundred LEDs and the light guide may be arranged on top of the light output area of ninety-five LEDs or ninety-nine LEDs. The first distance (D1) between the light guide and the at least one second light source may be in the range from 0.1 to 20 mm. More preferably, the first distance (D1) between the light guide and the at least one second source may be in the range from 0.1 to 15 mm. Most preferably, the first distance (D1) between the light guide and the at least one second light source may be in the range from 0.1 to 10 mm. For example, the first distance (D2) between the light guide and the at least one second light source is 0.2 mm.

In an embodiment, the light guide is elongated and has a length L, a width W and height H. Preferably, the length L is at least 30 times the width W and the length L is at least 50 times the height H. More preferably, the length L is at least 60 times the width W and the length L is at least 70 times the height H. Most preferably, the length L is at least 90 times the width W and the length L is at least 90 times the height H. The obtained effect is that suggested dimensions results in a flexible linear lighting module which is desired in several lighting applications such as cove and accent lighting. The height H of the light guide is preferably less than 20 mm. More preferably, the height H of the light guide is less than 10 mm. Most preferably, the height H of the light guide is less than 8 mm. The width W of the light guide is preferably less than 40 mm. More preferably, the width W of the light guide is less than 20 mm. Most preferably, the width W of the light guide is less than 10 mm. The length L of the light guide is preferably more than 500 mm. More preferably, the length L of the light guide is more than 800 mm. Most preferably, the length L of the light guide is more than 1000 mm. For example, the light guide has a length L of 1000 mm, a width W of 10 mm, and a height H of 5 mm. The light guide may be made of a polymer material such as poly methyl methacrylate (PMMA), poly carbonate (PC), silicone material, etc.

In an embodiment, the light guide is arranged on top of the light output area of more than 90% of the plurality of first light sources. The light out-coupling portions of the light guide are interleaved with respect to the first light sources. The obtained effect is improved efficiency. The reason is that less first light is redirected by the plurality of light out-coupling portions. Redirected light results in reflection losses or lower light utilization. The first area of the light out-coupling portions of the light guide may not overlap with the second area covered by the plurality of first light sources. The obtained effect is further improved efficiency. No, or almost no, first light is coupled into the light guide via the light out-coupling portions. The reason is that there is no overlap between the light out-coupling portions of the light guide and the plurality of first light sources.

In an embodiment, the light guide comprises a center part and a peripheral part. The refractive index of the center part is at least 1.02 times higher than the refractive index of the peripheral part. More preferably, the refractive index of the center part is at least 1.05 higher than the refractive index of the peripheral part. Most preferably, the refractive index of the center part is at least 1.1 higher than the refractive index of the peripheral part. The obtained effect is that the peripheral part causes light to be confined to the center part of the light guide by total internal reflection at the boundary between the two. The center part is preferably a core and the peripheral part is preferably a cladding. Optionally, the peripheral part or cladding may comprise a jacket. A jacket is a material at least partly encapsulating the peripheral part or cladding and thus protecting it from, for example, damaging such as scratches. The light guide may be an optical fiber.

In an embodiment, the plurality of first light sources are spaced at a pitch of at least 5 mm. More preferably, the plurality of first light sources are spaced at a pitch of at least 7 mm. Most preferably, the plurality of first light sources are spaced at a pitch of at least 8 mm. The obtained effect is cost reduction. The reason is that the number of first light sources can be reduced which results in lower cost in terms of light sources but also in terms of assembly cost.

In an embodiment, at least a transparent carrier is arranged between the plurality of first light sources and the light guide. The light guide is attached to or embedded in the at least partly transparent carrier. The obtained effect is that it improves safety and ingress protection of the lighting module. For example, the LEDs and the light guide may be encapsulated by the transparent carrier. In an example, the LEDs are encapsulated by the transparent carrier and the light guide is attached to the transparent carrier i.e. the light guide is not fully encapsulated by the transparent carrier. The transparent carrier is preferably a flexible material. For example, the transparent carrier is a rubber type of material such as a silicone material. The transparent carrier has preferably a transmission of at least 80%. More preferably, the transparent carrier has a transmission of at least 85%. Most preferably, the transparent carrier has a transmission of at least 90%. In an alternative embodiment, instead of a transparent carrier the light guide may be surrounded with air. A light guide surrounded with air prevent as much as possible light in-coupling of the first light in the light guide, while it provides desired total internal reflection (TIR) of the second light in the light guide.

The present invention discloses a lighting system in accordance with the independent claim 12.

In an embodiment, a lighting system comprises said lighting module. The lighting system further comprises a control unit which is electrically connected to the plurality of first light sources and the at least one second light source to separately control the amount of first light and second light. The obtained effect is that the lighting system provides high quality light both at high and low intensities. The lighting system may provide in a first mode i.e. first time period, high quality light at high intensity by providing only the first light. The lighting system may provide in a second mode i.e. second time period, high quality light at low intensity by providing only the second light. The lighting system may also provide in a first mode i.e. first time period, high quality light at high intensity by providing both the first light and the second light.

In an embodiment the lighting system further comprises at least one sensor configured for sensing the ambient light intensity, color and/or color temperature in a region surrounding the lighting system. The control unit is communicatively coupled to at least the at least one sensor, the plurality of first light sources and the at least one second light source. The control unit is configured to control operation of the plurality of first light sources and the at least one second light source based on information regarding the light intensity, color and color temperature in the region obtained by the at least one sensor to control the intensity of the lighting system in dependence on the ambient lighting. The obtained effect is that the lighting system provides either high quality light at high intensities or high quality light at low intensities dependent on the ambient light conditions. For example, in the evening or night when the sensor senses a low light intensity the lighting system provides high quality light at low intensity, while in the morning or afternoon when the sensor senses a high light intensity the lighting system provides high quality light at high intensity.

In an embodiment, the lighting system further comprises a clock module for supplying the time of a day. The control unit is communicatively coupled to the clock module, the plurality of first light sources and the at least one second light source. The control unit is configured to control operation of the plurality of first light sources and the at least one second light source based on information regarding the time of the day. The obtained effect is that lighting system provides either high quality light at high intensities or high quality light at low intensities dependent the time of the day. For example, at 23:00 hrs the lighting system provides high quality light at low intensity, while at 18:00 hrs the lighting system provides high quality light at high intensity.

The present invention discloses a method of lighting in accordance with the independent claim 15.

In an embodiment, a method of lighting uses the lighting system. The method of lighting consists of switching by the control unit the lighting module between a first state in which the plurality of first light sources emit the first light and the at least one second light source does or does not emit the second light, and a second state in which the plurality of the first light sources do not emit the first light and the at least one second light source emits the second light. The obtained effect is that an easy controllable lighting system is obtained. For example, one can easy select between high quality light at high intensities or high quality light at low intensities. Switching by the control unit of the lighting module, between a first state in which the plurality of first light sources emit the first light and the at least one second light source does or does not emit the second light, and a second state in which the plurality of the first light sources do not emit the first light and the at least one second light source emits the second light, may depend on the input of the sensor and/or clock module.

BRIEF DESCRIPTION OF THE DRAWINGS

Embodiments of the invention will now be described, by way of example only, with reference to the accompanying schematic drawings in which corresponding reference symbols indicate corresponding parts, and in which.

The schematic drawings are not necessarily on scale.

The same features having the same function in different figures are referred to the same references.

DETAILED DESCRIPTION OF THE EMBODIMENTS

Figure 1A:
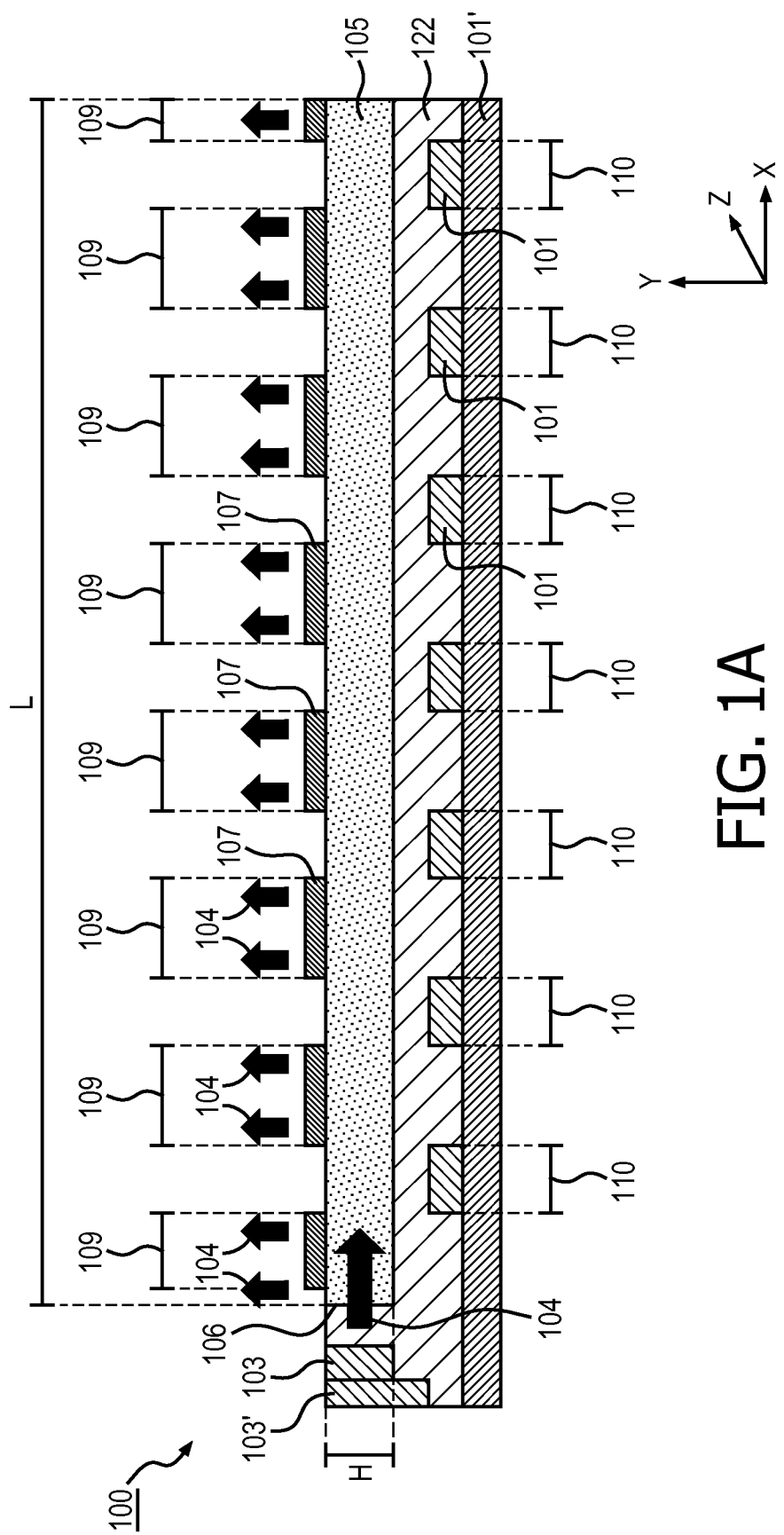
FIGS. 1a-1c schematically depict a cross-section of the lighting module along the length direction in the XY plane according to an embodiment of the present invention.
Figure 1B:
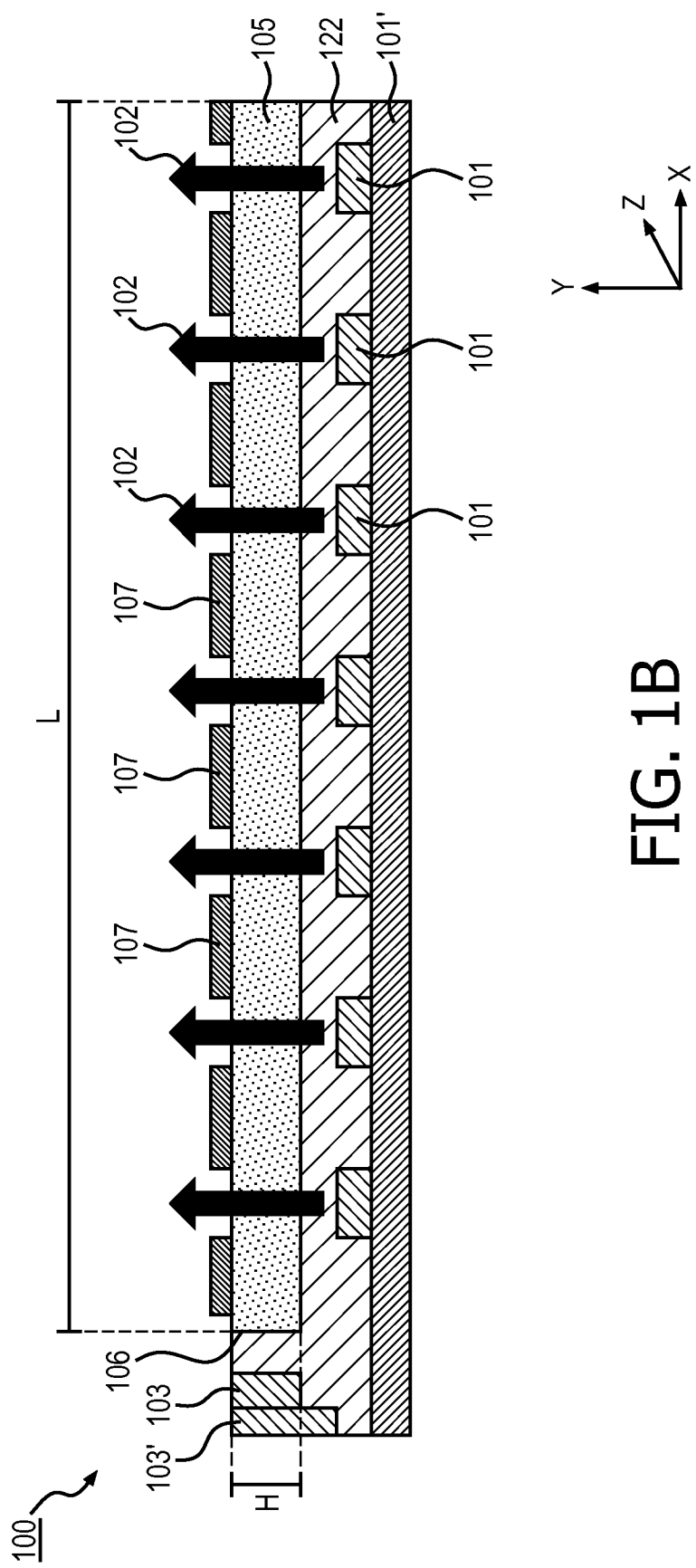
Figure 1C:
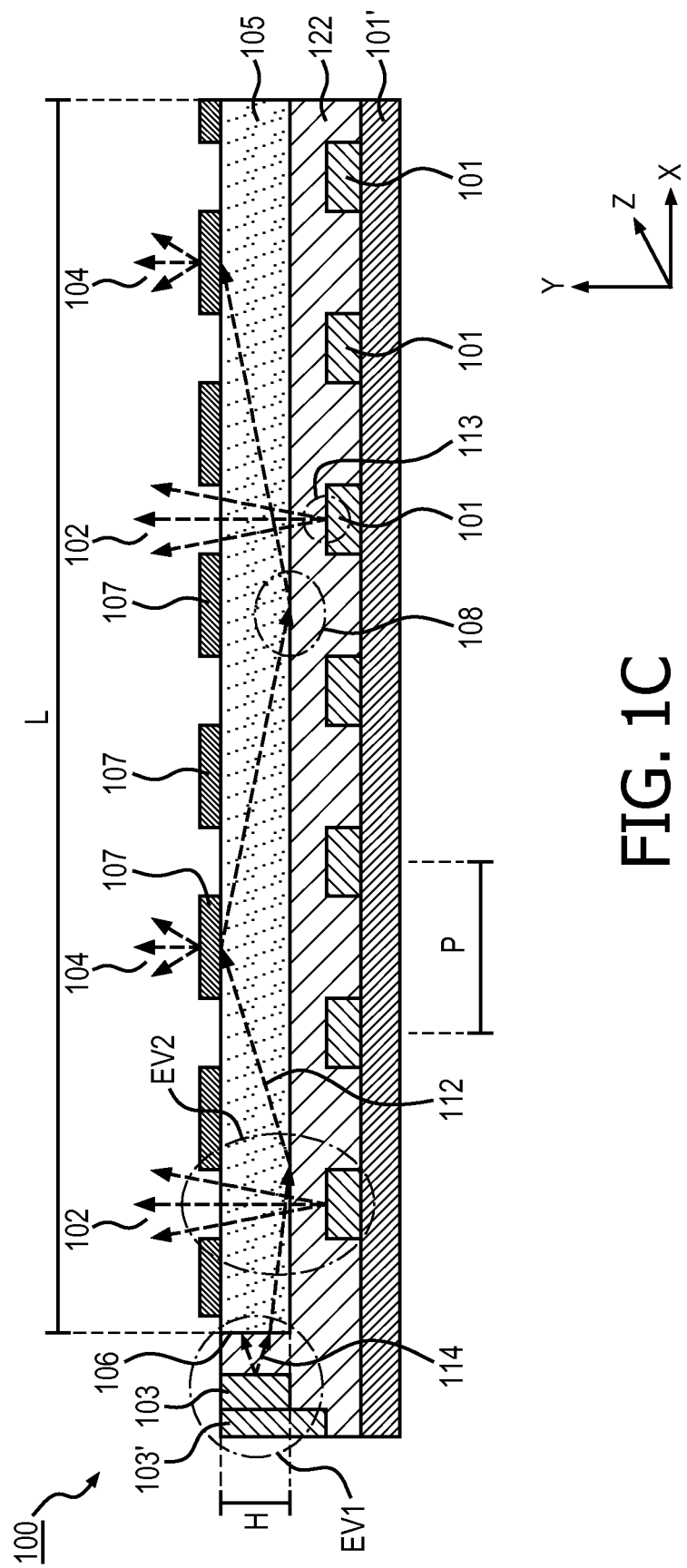

FIGS. 1a-1c schematically depict a cross-section of the lighting module 100 along the length direction in the XY plane according to an embodiment of the present invention. As depicted in FIG. 1a, the lighting module 100 comprises at least one second light source 103 which is configured to emit second light 104. As depicted in FIG. 1b, the lighting module 100 comprises a plurality of first light sources 101 which are configured to emit first light 102 in a first predetermined direction. As depicted in FIG. 1c, the lighting module 100 further comprises a light guide 105 which comprises at least one light in-coupling portion 106 to couple at least part of the second light 104 into the light guide 105, and a plurality of light out-coupling portions 107 to couple at least part of the second light 104 out of the light guide 105. The light guide 105 is arranged to guide the second light 104, which is coupled into the light guide 105 at the at least one light in-coupling portion 106, via total internal reflection 108 to the plurality of light out-coupling portions 107 to generate out-coupled light in a second predetermined direction. The light guide 105 is mechanically coupled to and extends along the plurality of first light sources 101. For example, the light guide 105 is mechanically coupled to the plurality of first light sources 101 via a transparent carrier 122. The transparent carrier 122 may have a lower refractive index to obtain total internal reflection 108 of the second light 104 in the light guide 105 and prevent as much as possible light in-coupling of the first light 102 in the light guide 105. In an alternative embodiment, element 122 is an empty space filled with air. In case element 122 is an empty space filled with air the surrounding of the light guide 105 is air and has a refractive index of 1 and thus prevent as much as possible light in-coupling of the first light 102 in the light guide 105, while it provides desired total internal reflection 108 of the second light 104 in the light guide 105. In an example, the light guide 105 is mechanically coupled to the plurality of first light sources 101 via one or more clamps, holders, pins or any other mechanical means. The light out-coupling portions 107 cover a larger first area 109 than a second area 110 covered by the plurality of first light sources 101. A total luminous flux generated by the at least one second light source 103 is lower than a total luminous flux generated by the plurality of the first light sources 101. The first predetermined direction and the second predetermined direction at least partly overlap. The first predetermined direction and the second predetermined direction may fully overlap. The plurality of first light sources 101 may be solid state light sources. The at least one second light source 103 may be a solid state light source. For example, the solid state light source or sources may be light emitting diodes (LEDs) or laser diodes. The plurality of first light sources 101 may be carried by a first carrier 101'. The at least one second light source may be carried by a second carrier 103'. The light guide 105 may be made from an inorganic material. For example, the light guide may be made from glass. The light guide 105 may be made from a polymer material. For example, the light guide 105 may be made from polymethylmethacrylate (PMMA) or polycarbonate (PC). The light guide 105 may also be made from a hybrid material i.e. from an inorganic material and a polymer material. For example, the light guide 105 may be made from glass and covered by a layer of polymethylmethacrylate (PMMA) or polycarbonate (PC). The plurality of light out-coupling portions 107 may be made from a light scattering material dispersed in a matrix material. For example, BaSO4, TiO2 and/or Al2O3 particles may be dispersed in a silicone type of material, such as for example, polydimethylsiloxane (PDMS). The light out-coupling portions 107 may also be a surface relief pattern in or on the light guide 105. The at least one light incoupling portion 106 may be a first end of an elongated light guide 105. The lighting module 100 may also comprise more than one light incoupling portion 106 such as for example two light incoupling portions 106. For example, a first light incoupling portion may be located at the first end of the light guide 105 and the second light incoupling portion 106 may be located at a second end of the light guide 105. The second end of the light guide 105 may be positioned opposite to the first end of the light guide 105. The light incoupling portion 106 may be flat and parallel positioned with respect to the at least one second light source 103. The light incoupling portion 106 may be also be shaped. For example, the light incoupling portion 106 may be convex to improve the light incoupling. The light guide 105 may be coupled to the plurality of first light sources 101 by a mechanical means. Preferably, an air gap exists between the first light sources 101 and the light guide 105 to prevent as much as possible light in-coupling of the first light 102 in the light guide 105, while it provides desired total internal reflection 108 of the second light 104 in the light guide 105. It is also possible to use a low refractive index material which also works as cladding for the light guide 105 and prevent as much as possible light in-coupling of the first light 102 in the light guide 105. The plurality of first light sources 101 may be placed on a first carrier 101' and/or the at least one second light source 103 may be placed on a second carrier 103'. The mechanical means may also, for example, be a clamp, pin or any other means to mechanically couple the light guide 105 to the plurality of first light sources 101. The light out-coupling portions 107 cover a larger first area 109 than a second area 110 covered by the plurality of first light sources 101. For example, the plurality of first light sources 101 may comprise hundred LEDs. Each LEDs may have a light output surface of one square millimeter. The area 110 covered by the plurality of first light sources 101 is thus 100 square millimeters. The light out-coupling portions 107 may comprise five hundred light out-coupling portions. Each light out-coupling portion may have a surface of two square millimeters. The area 109 covered by the light out-coupling portions 107 is thus 1000 square millimeters.

As depicted in FIG. 1a-c, the plurality of first light sources 101 may be spaced at a pitch P. Preferably, the plurality of first light sources 101 may be spaced at a pitch P of at least 5 mm. More preferably, the plurality of first light sources 101 may be spaced at a pitch P of at least 7 mm. Most preferably, the plurality of first light sources 101 may be spaced at a pitch P of at least 8 mm. For example, the plurality of first light sources 101 may be spaced at a pitch P of 10 mm.

Figure 2A:
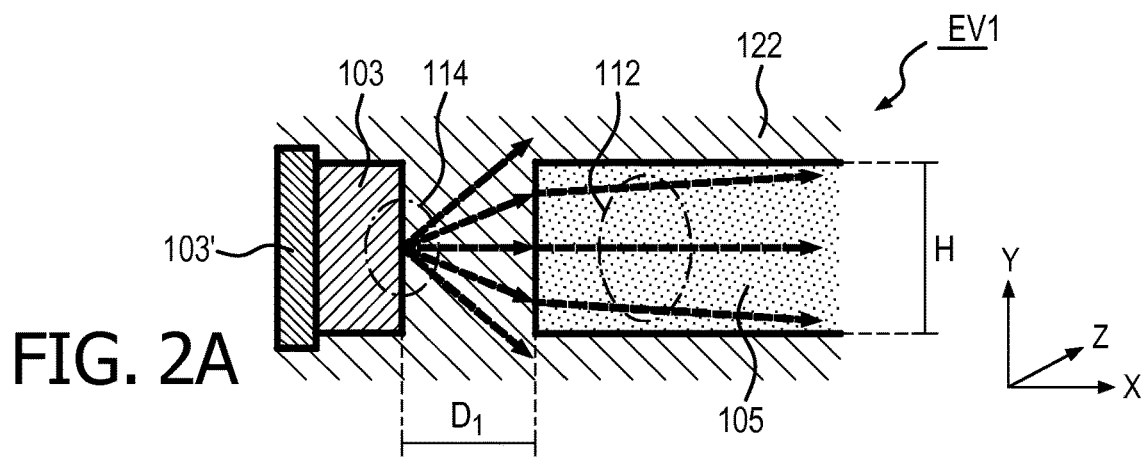
FIG. 2a-2c schematically depict an exploded view of a cross-section of the lighting module according to another embodiment of the present invention.
Figure 2B:
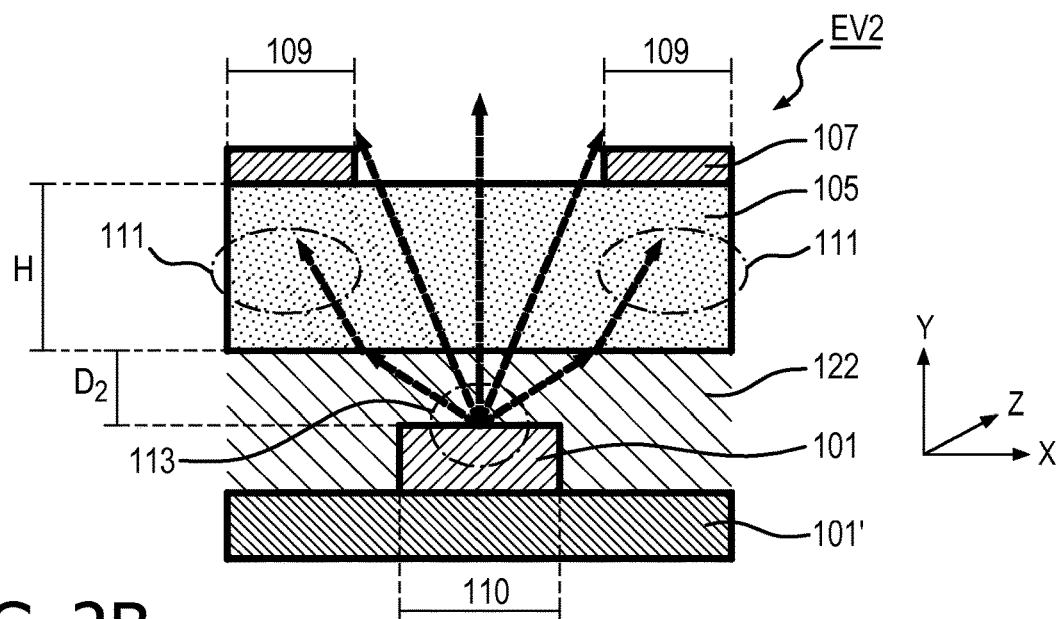
Figure 2C:
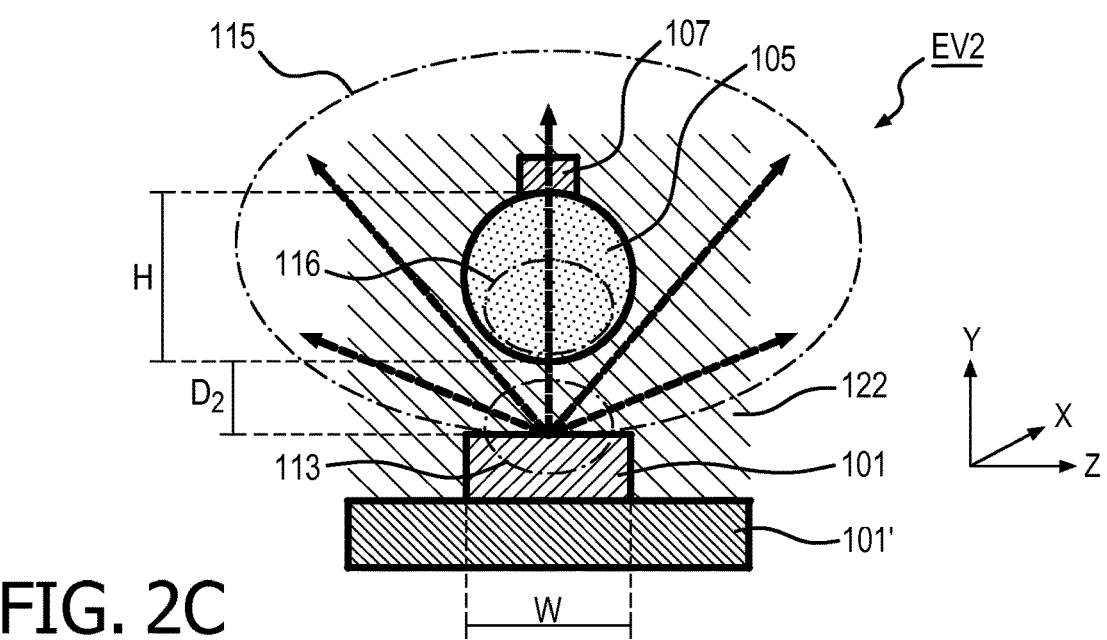

FIG. 2a-2c schematically depict an exploded view of a cross-section of the lighting module 100 according to another embodiment of the present invention. FIG. 2a depicts a first exploded view EV1 of a cross-section of the lighting module 100 along the length direction in the XY plane. The at least one second light source 103 may be positioned onto a second carrier 103'. The light guide 105 may be located at a first distance D1 close to the at least one second light source 103. The light guide 105 may be coupled to the at least one second light source 103 by a mechanical means. The mechanical means may be a transparent carrier 122. FIG. 2b depicts a second exploded view EV2 of a cross-section of the lighting module 100 along the length direction in the XY plane. The plurality of first light source 101 may be positioned onto a first carrier 101'. The light guide 105 is located close to the plurality of first light sources 101. The light guide 105 comprises the plurality of light out-coupling portions 107. The light guide 105 may be coupled to the plurality of first light sources 101 by a mechanical means. The mechanical means may be a transparent carrier 122. FIG. 2c depicts the second exploded view EV2 of a cross-section of the lighting module 100 along the length direction in the YZ plane. The plurality of first light source 101 is positioned onto a first carrier 101'. The light guide 105 is located close to the plurality of first light sources 101. The light guide 105 comprises the plurality of light out-coupling portions 107. The light guide 105 may be coupled to the plurality of first light sources 101 by a mechanical means. The mechanical means may be a transparent carrier 122. As depicted in FIG. 2a-c, the lighting module 100 may satisfy the equation wherein the first term I2/E2 is larger than the second term I1/E1. I1 is the amount of in-coupled photons emitted by the plurality of first light sources and that is coupled into the light guide 111. I2 is the amount of in-coupled photons emitted by the at least one second light source and that is coupled into the light guide 112. E1 is the amount of photons emitted by the plurality of first light sources 113. E2 is the amount of photons emitted by the at least one second light source 114. The amount of in-coupled photons emitted by the plurality of first light sources 111 is light guided in the light guide 105 by total internal reflection 108. The amount of in-coupled photons emitted by the at least one second light source 112 is light guided in the light guide 105 by total internal reflection 108. Light which is not impinging on the light guide 105 is not coupled into the light guide 105. Some of the light which impinges on the light guide 105 may not be coupled into the light guide 105 because it strikes the medium boundary at an angle smaller than a particular critical angle with respect to the normal to the surface. Only light which impinges on the light guide 105 and strikes the medium boundary at an angle larger than a particular critical angle with respect to the normal to the surface is coupled into the light guide 105. The first carrier 101' and the second carrier 103' is preferably reflective. The reflectivity of the first carrier 101' and/or the second carrier 103' is preferably at least 70%, more preferably at least 80%, most preferably at least 90%.

As depicted in FIG. 2a-c, the ratio of the first term I2/E2 with respect to the second term I1/E1 may be at least 3. More preferably, the ratio of the first term I2/E2 with respect to the second term I1/E1 may be at least 5. More preferably, the ratio of the first term I2/E2 with respect to the second term I1/E1 may be at least 7.

As depicted in FIG. 2a-c, the plurality of first light sources 101 is arranged for emitting the first light in a beam 115. The light guide 105 is arranged in the path of the beam 115. The second term I1/E1 may be 0.1 or less. More preferably, the second term I1/E1 may be 0.07 or less. More preferably, the second term I1/E1 may be 0.05 or less.

As depicted in FIG. 2a-c, the ratio Ei1:E1 may be 80% or less. Ei1 is the amount of photons emitted by the plurality of first light sources and impinging on the light guide 116. E1 is the amount of photons emitted by the plurality of first light sources 113. More preferably, the ratio Ei1:E1 is 60% or less. Most preferably, the ratio Ei1:E1 is 40% or less.

As depicted in FIG. 2a-c, the second distance D2 between the light guide 105 and the plurality of first light sources 101 may be in the range from 1 to 20 mm. More preferably, the second distance D2 between the light guide 105 and the plurality of first light sources 101 may be in the range from 1 to 15 mm. Most preferably, the second distance D2 between the light guide 105 and the plurality of first light sources 101 may be in the range from 1 to 10 mm. For example, the second distance D2 between the light guide 105 and the plurality of first light sources 101 is 2 mm. The first distance D1 between the light guide 105 and the at least one second light source 103 may be in the range from 0.1 to 20 mm. More preferably, the first distance D1 between the light guide 105 and the at least one second source 103 may be in the range from 0.1 to 15 mm. Most preferably, the first distance D1 between the light guide 105 and the at least one second light source 103 may be in the range from 0.1 to 10 mm. For example, the first distance D2 between the light guide 105 and the at least one second light source 103 is 0.2 mm.

As depicted in FIG. 1a-c and FIG. 2a-c, the light guide 105 is elongated and has a length L, a width W and height H. Preferably, the length L may be at least 30 times the width W and the length L may be at least 50 times the height H. More preferably, the length L may be at least 60 times the width W and the length L may be at least 70 times the height H. Most preferably, the length L may be at least 90 times the width W and the length L may be at least 90 times the height H. The height H of the light guide 105 may be preferably less than 20 mm. More preferably, the height H of the light guide 105 may be less than 10 mm. Most preferably, the height H of the light guide 105 may be less than 8 mm. The width W of the light guide 105 may be preferably less than 40 mm. More preferably, the width W of the light guide 105 may be less than 20 mm. Most preferably, the width W of the light guide 105 may be less than 10 mm. The length L of the light guide 105 may be preferably more than 500 mm. More preferably, the length L of the light guide 105 may be more than 800 mm. Most preferably, the length L of the light guide 105 may be more than 1000 mm. For example, the light guide 105 has a length L of 1000 mm, a width W of 10 mm, and a height H of 5 mm. The light guide 105 may be made of a polymer material such as poly methyl methacrylate (PMMA), poly carbonate (PC), silicone material, etc.

As depicted in FIG. 1a-c and FIG. 2b, the light guide 105 may be arranged on top of the light output area of more than 90% of the plurality of first light sources 101. The light out-coupling portions 107 of the light guide 105 are interleaved with respect to the first light sources 101. The first area 109 of the light out-coupling portions 107 of the light guide 105 may not overlap with the second area 110 covered by the plurality of first light sources 101.

Figure 3A:
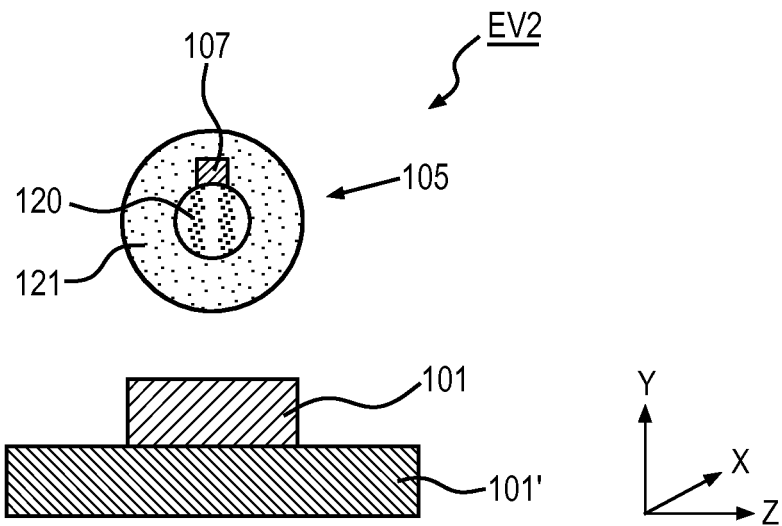
FIG. 3a-3b schematically depict an exploded view of a cross-section of the lighting module according to another embodiment of the present invention.
Figure 3B:
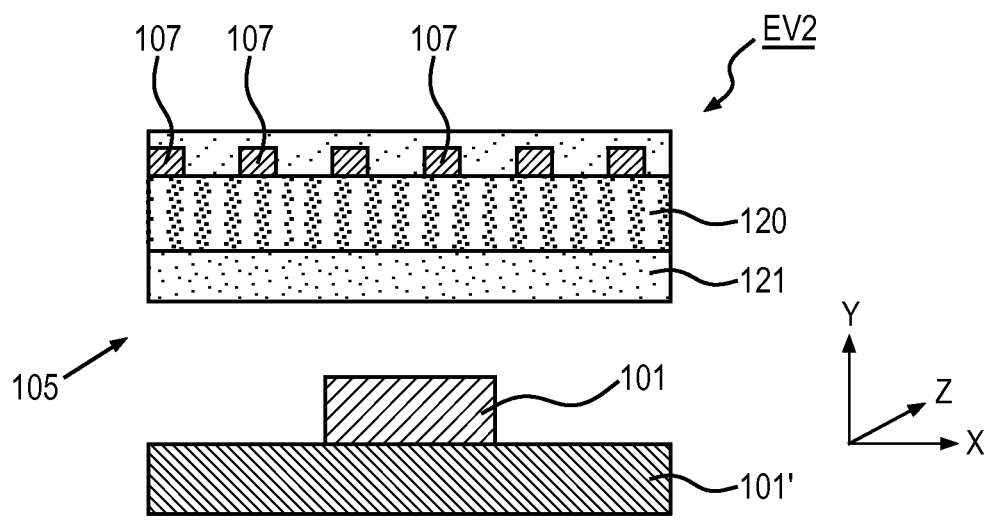

FIG. 3a-3b schematically depict an exploded view of a cross-section of the lighting module 100 according to another embodiment of the present. FIG. 3a depicts a second exploded view EV2 of a cross-section of the lighting module 100 in the YZ plane. FIG. 3b depicts a second exploded view EV2 of a cross-section of the lighting module 100 along the length direction in the XY plane. As depicted in FIG. 3a-3b, the light guide 105 comprises a center part 120 and a peripheral part 121. The light guide 105 is positioned above the plurality of first light sources 101. The first light sources may be carried by a first carrier 101'. The refractive index of the center part 120 may be at least 1.02 times higher than the refractive index of the peripheral part 121. More preferably, the refractive index of the center part 120 may be at least 1.05 higher than the refractive index of the peripheral part 121. Most preferably, the refractive index of the center part 120 may be at least 1.1 higher than the refractive index of the peripheral part 121. The center part 120 may be a core and the peripheral part 121 may be a cladding. Optionally, the peripheral part 121 may comprise a jacket. A jacket is a material at least partly encapsulating the peripheral part 121 and thus protecting it from, for example, damaging such as scratches. The light guide 105 may be an optical fiber. The light guide 105 may be flexible. For example, the center part 120 may be made of polymethylmethacrylate (PMMA) or polystyrene (PS) with refractive indices of 1.49 and 1.59, respectively. For example, the peripheral part 121 may be made of a silicone resin with a refractive index of 1.46.

Figure 4A:
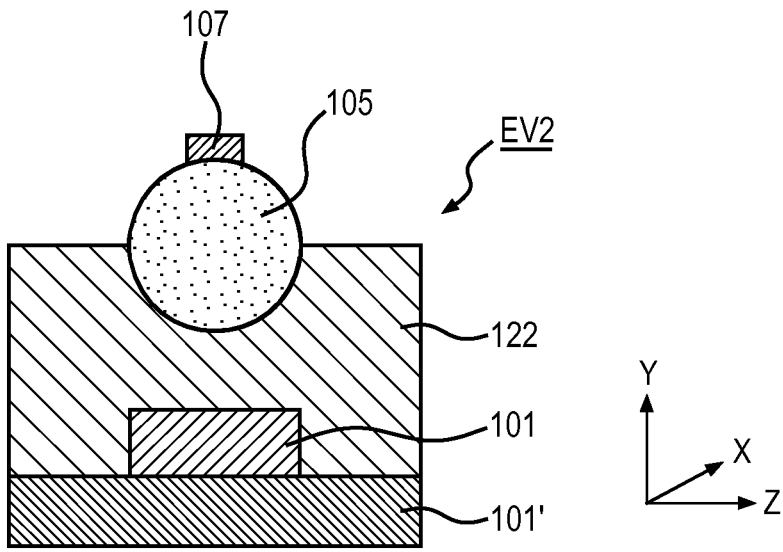
FIG. 4a-4b schematically depict an exploded view of a cross-section of the lighting module according to another embodiment of the present invention.
Figure 4B:
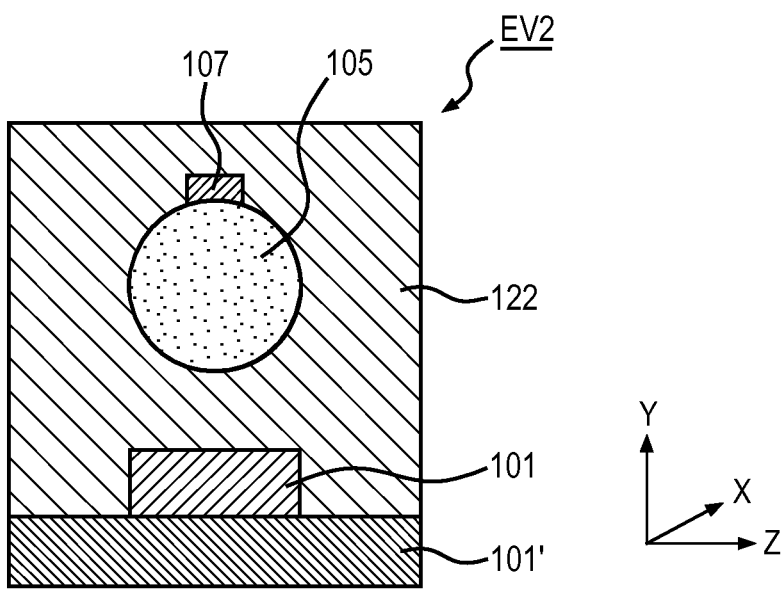

FIG. 4a-4b schematically depict an exploded view of a cross-section of the lighting module according to another embodiment of the present invention. FIG. 4a depicts a second exploded view EV2 of a cross-section of the lighting module 100 in the YZ plane. FIG. 4b depicts a second exploded view EV2 of a cross-section of the lighting module 100 along the length direction in the XY plane. The lighting module 100 comprises a transparent carrier 122 which may be arranged between the plurality of first light sources 101 and the light guide 105. As depicted in FIG. 4a, the light guide 105 is attached to the transparent carrier 122. As depicted in FIG. 4b, the light guide 105 is embedded in the transparent carrier. For example, the plurality of first light sources 101 and the light guide 105 may be encapsulated by the transparent carrier 122. In an example, the plurality of first light sources 101 are encapsulated by the transparent carrier 122 and the light guide 105 is attached to the transparent carrier 122 i.e. the light guide 105 is not fully encapsulated by the transparent carrier 122. The transparent carrier 122 is preferably a flexible material. For example, the transparent carrier 122 is a rubber type of material such as a silicone material. The transparent carrier 122 may preferably have a transmission of at least 80%. More preferably, the transparent carrier 122 may have a transmission of at least 85%. Most preferably, the transparent carrier 122 may have a transmission of at least 90%.

Figure 5:
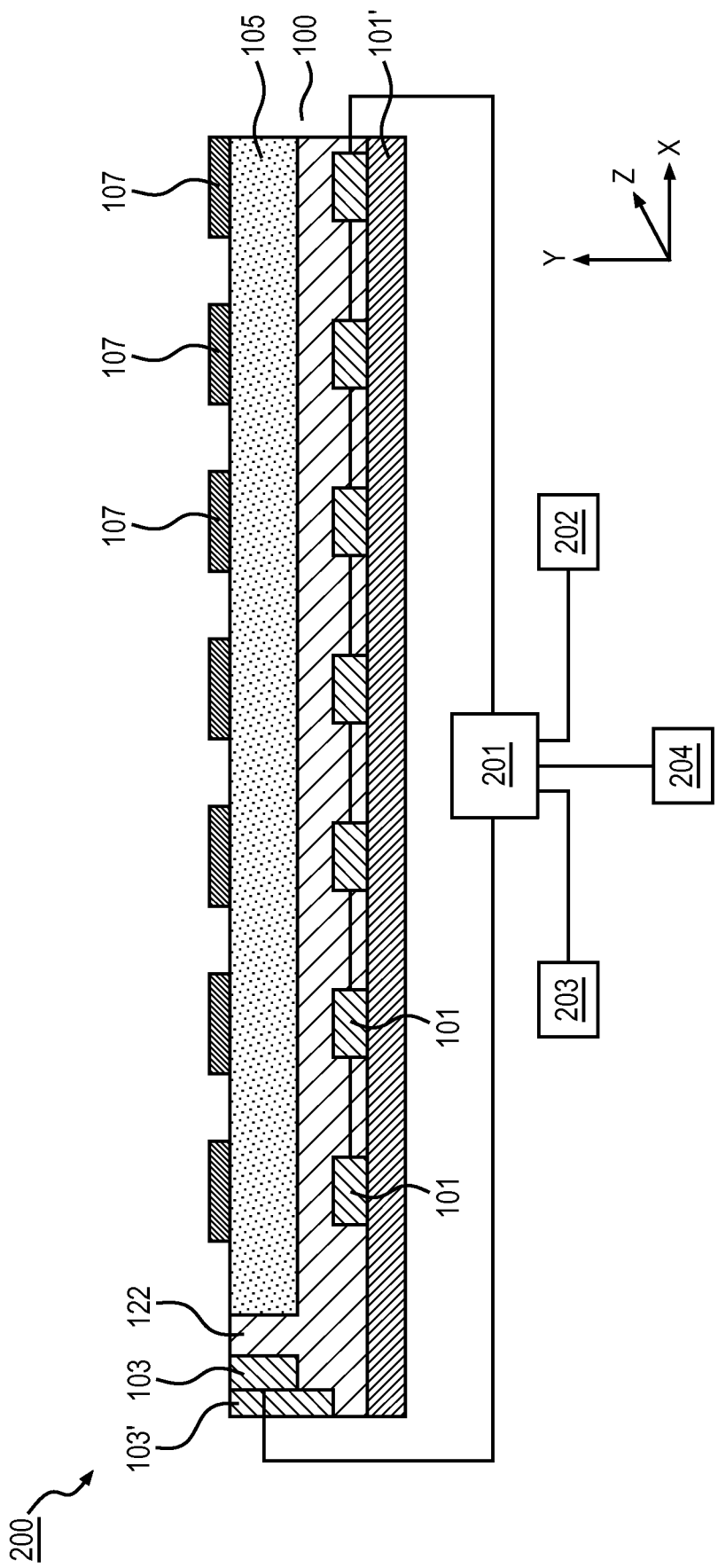
FIG. 5 schematically depicts a cross-section of the lighting system along the length direction in the XY plane according to another embodiment of the present invention.

FIG. 5 schematically depicts a cross-section of the lighting system 200 along the length direction in the XY plane according to another embodiment of the present invention. The lighting system 200 comprises said lighting module 100. The lighting system 200 further comprises a control unit 201 which is electrically connected to the plurality of first light sources 101 and the at least one second light source 103 to separately control the amount of first light 102 and second light 104. The lighting system 200 may provide in a first mode i.e. first time period, high quality light at high intensity by providing only the first light 102. The lighting system may provide in a second mode i.e. second time period, high quality light at low intensity by providing only the second light 104. The lighting system may also provide in a first mode i.e. first time period, high quality light at high intensity by providing both the first light 102 and the second light 104.

The lighting system 200 may further comprise at least one sensor 202 configured for sensing the ambient light intensity, color and/or color temperature in a region surrounding the lighting system 200. The control unit 201 is communicatively coupled to at least the at least one sensor 202, the plurality of first light sources 101 and the at least one second light source 103. The control unit 201 is configured to control operation of the plurality of first light sources 101 and the at least one second light source 103 based on information regarding the light intensity, color and color temperature in the region obtained by the at least one sensor 202 to control the intensity of the lighting system 200 in dependence on the ambient lighting. The lighting system 200 provides either high quality light at high intensities or high quality light at low intensities dependent on the ambient light conditions. For example, in the evening or night when the sensor 202 senses a low light intensity the lighting system 200 provides high quality light at low intensity, while in the morning or afternoon when the sensor 202 senses a high light intensity the lighting system 200 provides high quality light at high intensity.

The lighting system 200 may further comprise a clock module 204 for supplying the time of a day. The control unit 201 is communicatively coupled to the clock module 204, the plurality of first light sources 101 and the at least one second light source 103. The control unit 201 is configured to control operation of the plurality of first light sources 101 and the at least one second light source 103 based on information regarding the time of the day. For example, at 23:00 hrs the lighting system 200 provides high quality light at low intensity, while at 18:00 hrs the lighting system 200 provides high quality light at high intensity. A user interface 204 may be used to add data to the lighting system 300 which may be used, for example, to compare a measured value with respect to an input value V i.e. added data.

Figure 6:
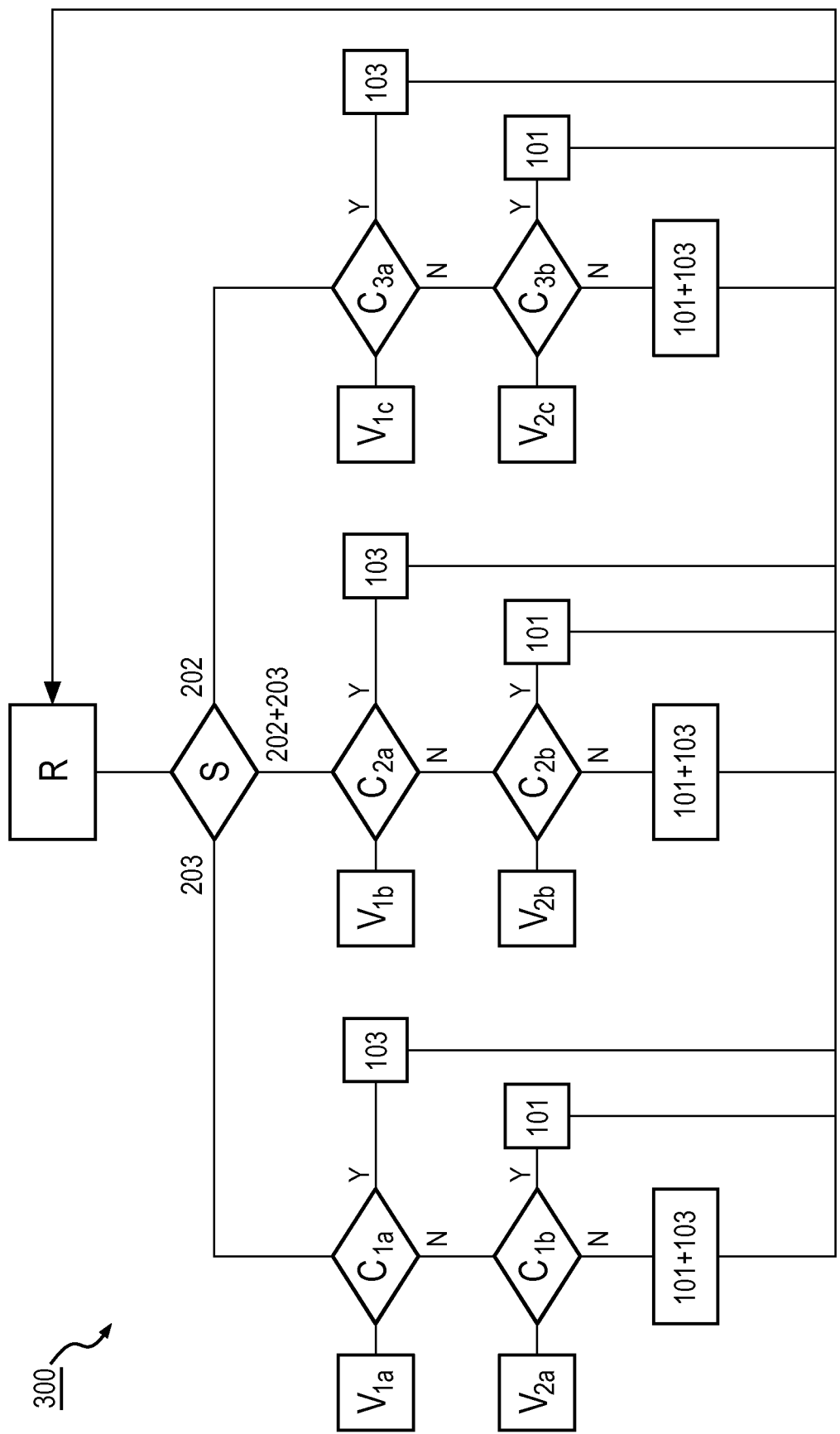
FIG. 6 schematically depicts a flow chart of the method of lighting using the lighting system.

FIG. 6 schematically depicts a flow chart of the method of lighting 300 using the lighting system 200. The method of lighting 300 uses the lighting system 200. The method of lighting 300 consists of switching by the control unit 201 the lighting system 200 between a first state in which the plurality of first light sources 101 emit the first light 102 and the at least one second light source 103 does or does not emit the second light 104, and a second state in which the plurality of the first light sources 101 do not emit the first light 102 and the at least one second light source 103 emits the second light 104. For example, one can easy select between high quality light at high intensities or high quality light at low intensities. Switching by the control unit 201 of the lighting system 200, between a first state in which the plurality of first light sources 101 emit the first light 102 and the at least one second light source 103 does or does not emit the second light 104, and a second state in which the plurality of the first light sources 101 do not emit the first light 102 and the at least one second light source 103 emits the second light 104, may depend on the input of the sensor 202 and/or clock module 203. As depicted in FIG. 6, in a first step the method of lighting 300 comprises the following steps: (i) The controller 201 receives R data from the light sensor 202 and/or clock module 203. (ii) The lighting system 200 is set S in a first state wherein only data from the clock module 203 is used, in a second state wherein only data from the sensor 202 is used, or a third state wherein both data from the clock module 203 and the sensor 202 is used. (iii) The data from the clock module 203, the data from the sensor 202, or the data from both the clock module 203 and the sensor 202 is compared C to at least with first values V1$x$. The first values can be programmed in the lighting system 200 using the user interface 204. In case data from the clock module 203, the data from the sensor 202, or the data from both the clock module 203 and the sensor 202 data meets the first values V1$x$, the at least one second light source 103 emits the second light 104. (iv) In case the measured data does not meet the first values V1$x$, the data from the clock module 203, the data from the sensor 202, or the data from both the clock module 203 and the sensor 202 is compared C at least with second values V2$x$. In case the measured data meets the second values V2$x$, the plurality of first light sources 101 emit the first light 102. In case the measured data does not meet the second values V2$x$, the plurality of first light sources 101 emit the first light 102 and the at least one second light source 103 emits second light 104.

The plurality of first light sources 101 and the at least one second light source 103 may be a solid state light emitters. Examples of solid state light emitters are Light Emitting Diodes (LEDs), Organic Light Emitting diode(s) OLEDs, or, for example, laser diodes. Solid state light emitters are relatively cost effective, have a relatively large efficiency and a long life-time. The LED light source may be a phosphor converted LED (a LED comprising a luminescent material) or a colored LED (a LED not comprising a luminescent material). The luminescent material is arranged for converting at least part of the light emitted by the LED into light of a longer wavelength. The luminescent material may be an organic phosphor, an inorganic phosphor and/or a quantum dot based material.

The lighting module 100 may be configured to provide white light. The term white light herein, is known to the person skilled in the art and relates to white light having a correlated color temperature (CCT) between about 2.000 K and 20.000 K. In an embodiment the CCT is between 2.500 K and 10.000K. Usually, for general lighting, the CCT is in the range of about 2700K to 6500K. Preferably, it relates to white light having a color point within about 15, 10 or 5 SDCM (standard deviation of color matching) from the BBL (black body locus). Preferably, it relates to white light having a color rendering index (CRI) of at least 70 to 75, for general lighting at least 80 to 85.

The term "substantially" herein, such as in "substantially all light" or in "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of". The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention further applies to a device comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

The invention claimed is:

1. A lighting module comprising:
   a plurality of first light sources configured for emitting first light in a first predetermined direction,
   at least one second light source configured for emitting second light,
   a light guide comprising a first light in-coupling portion for coupling at least a part of the first light into the light guide, a second light in-coupling portion for coupling at least a part of the second light into the light guide, and a plurality of light out-coupling portions for coupling of at least part of the second light out of the light guide,
   wherein the light guide is arranged for guiding the second light coupled into the light guide at the at least one light in-coupling portion via total internal reflection to the plurality of light out-coupling portions for generating out-coupled light in a second predetermined direction,
   wherein the light guide is mechanically coupled to and extends along the plurality of first light sources,
   wherein the light out-coupling portions extend along the plurality of first light sources and cover a larger first area than an second area covered by the plurality of first light sources, and wherein a total luminous flux generated by the at least one second light source is lower than a total luminous flux generated by the plurality of the first light sources, wherein the first predetermined direction and the second predetermined direction at least partly overlap, and wherein the ratio Ei:E1 is 80% or less, wherein Ei1 is the amount of photons emitted by the plurality of first light sources and impinging on the first light in-coupling portion, and E1 is the amount of photons emitted by the plurality of first light sources.

2. A lighting module according to claim 1, wherein the first term I2/E2 is larger than the second term I1/E1, wherein I1 is the amount of in-coupled photons emitted by the plurality of first light sources and that is coupled into a portion of the light guide, I2 is the amount of in-coupled photons emitted by the at least one second light source and that is coupled into the light guide, E1 is the amount of photons emitted by the plurality of first light sources, and E2 is the amount of photons emitted by the at least one second light source.

3. A lighting module according to claim 1, wherein the ratio of the first term I2/E2 with respect to the second term I1/E1 is at least 3.

4. A lighting module according to claim 1, wherein the plurality of first light sources is arranged for emitting the first light in a beam, wherein the light guide is arranged in the path of the beam, and wherein the second term I1/E1 is 0.1 or less.

5. A lighting module according to claim 1, wherein the second distance (D2) between the light guide and the plurality of first light sources is in the range from 1 to 20 mm.

6. A lighting module according to claim 1, wherein the light guide is elongated and has a length (L), a width (W) and height (H) wherein the length (L) is at least 30 times the width (W) and the length (L) is at least 50 times the height (H).

7. A lighting module according to claim 1, wherein the light guide is arranged on top of the light output area of more than 90% of the plurality of first light sources, wherein the light out-coupling portions of the light guide are interleaved with respect to the first light sources.

8. A lighting module according to claim 1, wherein the light guide comprises a center part and a peripheral part, the refractive index of the center part is at least 1.02 times higher than the refractive index of the peripheral part.

9. A lighting module according to claim 1, wherein the plurality of first light sources are spaced at a pitch (P) of at least 5 mm.

10. A lighting module according to claim 1, comprising at least a transparent carrier arranged between the plurality of first light sources and the light guide wherein the light guide is attached to or embedded in the at least partly transparent carrier.

11. A lighting system comprising said lighting module according to claim 1, further comprising a control unit electrically connected to the plurality of first light sources and the at least one second light source for separately controlling the amount of first light and second light.

12. A lighting system comprising said lighting module according to claim 11, further comprising at least one sensor configured for sensing the ambient light intensity, color and/or color temperature in a region surrounding the lighting system, and wherein the control unit is communicatively coupled to at least the at least one sensor, the plurality of first light sources and the at least one second light source, the control unit being configured for controlling operation of the plurality of first light sources and the at least one second light source based on information regarding the light intensity, color and color temperature in the region obtained by the at least one sensor for controlling the intensity of the lighting system in dependence on the ambient lighting.

13. A lighting system comprising said lighting module according to claim 11, further comprising a clock module for supplying the time of a day and the control unit communicatively coupled to the clock module, the plurality of first light sources and the at least one second light source, the control unit being configured for controlling operation of the plurality of first light sources and the at least one second light source based on information regarding the time of the day.

14. A method of lighting using lighting system according to claim 11 comprising switching by the control unit the lighting module between a first state in which the plurality of first light sources emit the first light and the at least one second light source does or does not emit the second light, and a second state in which the plurality of the first light sources do not emit the first light and the at least one second light source emits the second light.

* * * * *